United States Patent [19]
Misch et al.

[11] 3,939,688
[45] Feb. 24, 1976

[54] VOLUMETRIC CALIBRATION

[75] Inventors: Dieter R. Misch, Tallmadge; Otto A. Huiber, Barberton, both of Ohio

[73] Assignee: Edge Saw Manufacturing Company, Grand Rapids, Mich.

[22] Filed: Sept. 16, 1974

[21] Appl. No.: 506,356

[52] U.S. Cl. .......................... 73/3; 73/168; 222/135
[51] Int. Cl.² ........................................ G01F 25/00
[58] Field of Search ................... 73/3; 222/23, 135

[56] References Cited
UNITED STATES PATENTS

| | | | |
|---|---|---|---|
| 3,125,879 | 3/1964 | Porter | 73/3 |
| 3,216,622 | 11/1965 | Drostholm | 73/3 |
| 3,270,549 | 9/1966 | Martin | 73/3 |
| 3,306,495 | 2/1967 | Wabers | 222/135 |

*Primary Examiner*—S. Clement Swisher
*Attorney, Agent, or Firm*—McGarry & Waters

[57] ABSTRACT

A completely enclosed system for volumetric calibration wherein timed valves divert liquid components into separate metering tubes for observation. Pistons or separators in the metering tubes are displaced by the flow of liquid thereto. After the calibration or measurement in the metering tubes, the components are returned to the circulating system by applying a pressure to the metering tubes by means of air or an inert fluid whereby the components are driven back through the valves. A separate displacement cylinder can be coupled to the metering tubes through the inert fluid to measure total displacement of both components.

8 Claims, 2 Drawing Figures

VOLUMETRIC CALIBRATION

BACKGROUND OF THE INVENTION

1. Field of the Invention

The present invention relates to volumetric calibration devices. In one of its aspects, the invention relates to a closed volumetric calibration system for liquid components in a polyurethane system.

2. State of the Prior Art

In the molding of polyurethane, isocynate, resin and other components are pumped to a mixing head. It is important that the components are in the proper ratios or the resulting polyurethane products will not be of the desired quality and specification. It is necessary to regularly check the dispensed amounts of various components to make certain that the ratios are constant. After checking the various amounts of dispensed components, the pumping device can be adjusted, if necessary, to correct the ratio.

In the past when it has been desired to conduct volumetric calibration or measuring operations on these circulating liquid materials, it has been the practice to take the components separately from the mixing head in a normal dispensing operation and to physically place each component in a cup to be weighed on a scale. This procedure takes substantial time in conducting a calibration. Further, exposure of the components to air created a high probability of contamination and the materials were customarily discarded. Further, the isocynate component can be noxious and there is the risk of danger to the person conducting the calibration. This procedure was thus somewhat time consuming and resulted in the waste of components.

To facilitate calibration of liquid materials, a special system with separate valves installed in the circulating system has been provided to meter liquid from the system. Such systems are cumbersome and still subject the worker to the chemical hazard. Further, the components cannot be returned to the circulating system without the risk of possible contamination.

SUMMARY OF THE INVENTION

In accordance with the present invention, a simple volumetric calibration device is provided to remove multiple liquid components from a circulating system, conduct the required volumetric calibration quickly and then subsequently return the materials back to the system without contaminating the materials and without exposure of the materials to the atmosphere. The volumetric calibration device comprises a volumetric holding means, a measuring means on the holding means for ascertaining the amount of liquid contained therein, a valve means in flow communication with the holding means capable of selectively controlling the flow of materials to and from the holding means and fluid drive means operatively coupled to the holding means for displacing materials contained in the holding means whereby the liquids in the holding means can be returned to a circulating system without exposure to the atmosphere.

The valve means desirably is capable of selectively controlling the flow of multiple components of materials into a multiplicity of separate holding means, so as to allow multiple calibrations of materials from multiple circulating systems, either separately or at the same time. The fluid drive means allows removal of the liquid materials from the holding means without contamination thereof so that the materials may still be used as desired. Desirably a timer is used to control the valves so that the amount of materials that are diverted into holding means for calibration measurement is controlled.

The volumetric calibration device may be utilized with circulating or noncirculating systems of liquid materials, but is particularly useful in polyurethane systems involving hazardous materials from which an operator must be protected.

In accordance with the present invention, volumetric calibration of materials is accomplished first by removing the materials from the system in which they are contained, followed by calibration measurement of the materials in separate holding means, and finally by fluid drive of the materials back into the system from which they were removed without exposure to the atmosphere.

BRIEFF DESCRIPTION OF THE DRAWINGS

FIG. 1 is a schematic drawing showing the volumetric calibration device of the present invention in a flow stream of circulating liquidous materials; and FIG. 2 is a fragmented front elevational view of the hardware components of the preferred embodiment of the present invention.

DESCRIPTION OF THE PREFERRED EMBODIMENT

Figure 1:
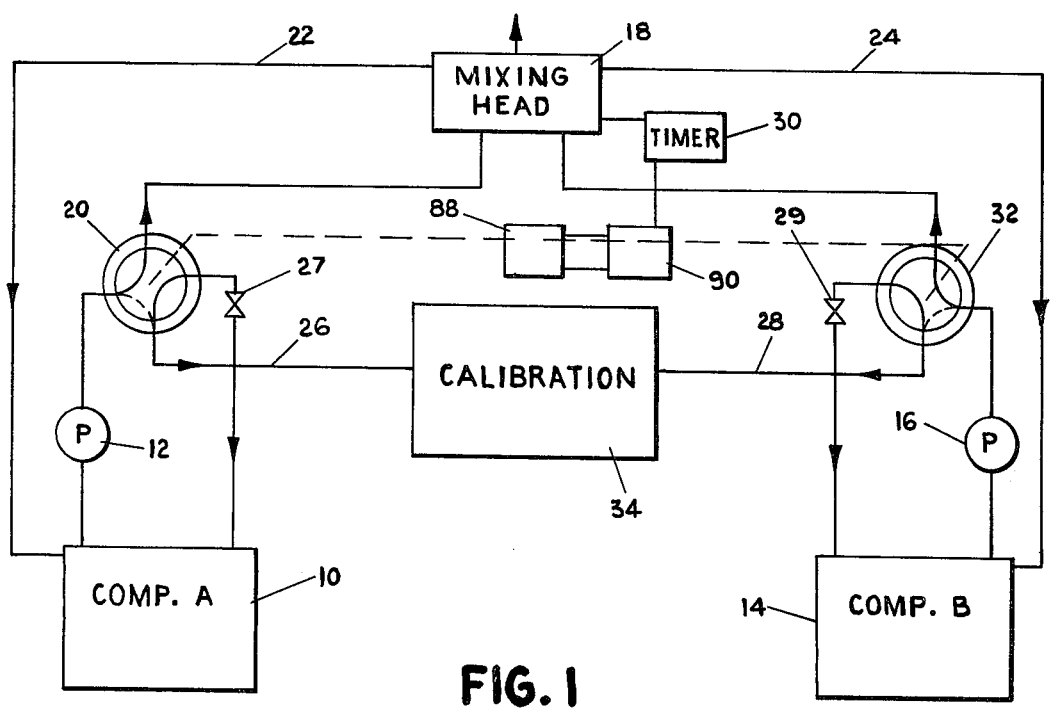

Referring now to the drawings and in particular to FIG. 1, there is shown a two-component circulating system of materials as, for example, in a system for supplying two components for a polyurethane system. Liquid component A and liquid component B are contained respectively in tanks 10 and 14. Pumps 12 and 16, respectively, pump the liquid components A and B, respectively, through valves 20 and 32 to mixing head 18 wherein the components are mixed as desired and then dispensed therefrom. Timer 30 controls the time interval of the dispensing cycle. During intervals when the components are not mixed and dispensed in the mixing head 18, the liquid components are returned through lines 22 and 24 to the tanks 10 and 14, respectively. The mixing head 18 and the circulating systems, including the pumps, are well known in the polyurethane industry. A suitable system is sold by North American Urethane Division of Edge Saw Company.

Measurement of the amount of materials being pumped by pumps 12 and 16 in a given time interval is accomplished by diverting the flow of the components at valves 20 and/or 32 for a controlled period of time into calibration device 34 for calibration therein. Valves 27 and 29 are provided in the return line 27a and 29a respectively. During the calibration cycle, valves 27 and 29 remain closed and keep the metered amount in the calibration tubes. The valves 20 and 32 are controlled by activator 88 which in turn is controlled by the timer 30 through solenoid valve 90. During this diverting period, the liquid component A will be diverted by valve 20 through line 26 into the calibration unit 34. Similarly, liquid component B will be diverted by valve 32 through line 28 to the calibration unit 34. At the end of the timed interval, the valves 20 and/or 32 are switched back to the position illustrated in FIG. 1 so that components A and B flow again to the mixing head 18. After calibration, valves 27 and 29 are opened and the components A and B are forced back to the tanks 10 and 14, respectively. Component A flows through line 26, valve 20 and line 27a. Component B flows through line 28, valve 32 and line 29a.

Figure 2:
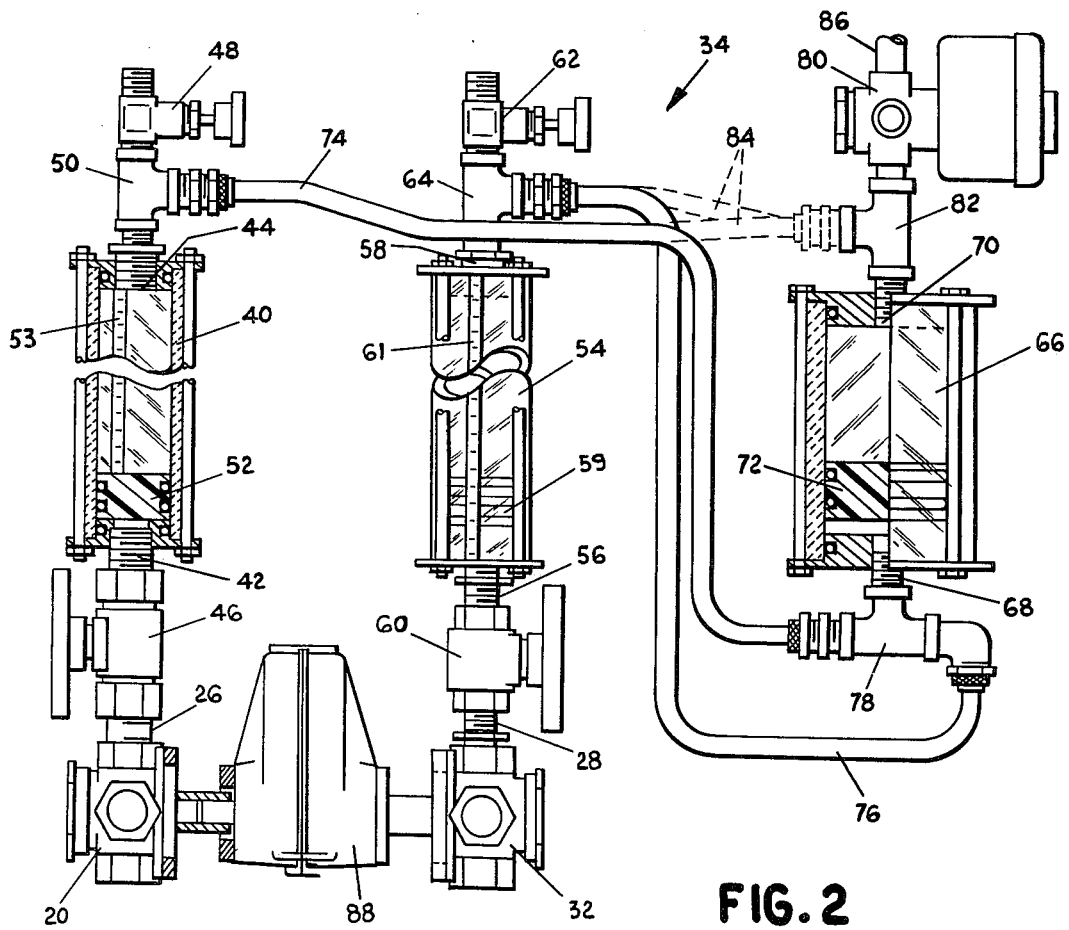

Referring now to FIG. 2, calibration device 34 includes metering tubes 40 and 54 which are in flow communications with holding cylinder 66 by means of lines 74 and 76, respectively.

Metering tube 40 has an inlet opening 42 which is in flow communication with four-way pressure control valve 20 through a valve 46. An outlet opening 44 in metering tube 40 is in communication with the hose line 74 through a T connection 50. A bleed valve 48 is provided at the T connection 50 to bleed air from the tube 40 when desired. A piston 52 having seals at the edge thereof is provided within the tube. A scale 53 is secured to the outside of the tube 40 so that the position of the piston in the cylinder can be accurately measured.

The metering tube 54 is of like construction to the metering tube 40. An inlet 56 in the metering tube 54 is connected to the four-way valve 32 through a needle valve 60. A piston 59 is provided within the metering tube 54 and a scale 61 or other suitable marking is provided on the outside of the metering tube to accurately measure the position of the piston 59 within the tube 54. An outlet 58 of the metering tube 54 has a T connection through which it communicates with a bleed valve 62 and hose line 76.

Holding container 66 has an inlet 68 with a T connection 78 through which the container is connected to the hose lines 74 and 76. An outlet 70 in the cylinder is connected to an air pressure line 86 through T connection 82 and solenoid operated valve 80. The other opening in the T connection 82 can be plugged or alternatively connected to T connections 50 and/or 64 through hose 84 (shown in phantom lines) in lieu of hose lines 74 and 76.

The pistons 52, 59, and 72 are made of TEFLON with dual VITON seals. These pistons form physical separators for the components in the tubes 40 and 54 and between the air or inert liquid in container 66.

Metering tubes 40 and 54, respectively, are each in flow communication with the circulating liquid components A and B by means of four-way valves 20 and 32, respectively. Positioned between valves 20 and 32, pneumatic actuator 88 acts to control opening and closing of valves 20 and 32. Preferably, a neutral liquid, such as dioctylphthalate (DOP) is placed in the calibration system between pistons 52 and 72, and between pistons 59 and 72. The neutral liquid avoids contamination of the liquid in the metering tubes 40 and 54 by air or moisture in the air.

Metering tubes 40 and 54 are cylindrical in shape and are made of transparent materials to allow viewing therethrough. The volume of the tubes may vary, depending on the shotsize of each component, with the tubes being calibrated in cc increments. Pneumatic cylinder 40 is a similar cylindrical shape and made from similar materials. Four-way valves 22 and 32, and pneumatic actuator 88, are commercially available and of conventional design.

The four-way valves 20 and 32 allow material flow from the circulating system to the mixing head or will divert the stream from the system to metering tubes 40 and/or 54. As readily apparent by the above description, pneumatic operator 88 can be utilized to engage four-way valve 20 and 32 either separately or simultaneously.

When it is desired to calibrate materials dispensed from the mixing head 18, solenoid valve 90 switches pneumatic actuator 88 to move valves 20 and/or 32 so as to allow a flow of component A and/or B into the respective metering tubes 40 and 54. Valves 27 and 29 remain closed. After a predetermined interval measured by timer 30, the actuator 88 switches the valves back to the position shown in FIG. 1. The components will force the pistons 52 and 59 upward in the tubes, thereby displacing the fluid therebetween and piston 72.

After the valves 20 and 32 have been switched back to their initial position, the amount of each liquid can be read directly from the tubes 40 and 54 by observing the position of the bottom edge of the pistons 52 and 59 with respect to the scales 53 and 61. The total amount of the shot can, if desirable, be read from a scale (not shown) on the holding container 66. In the calibration operation, the valves 46 and 60 serve to simulate the pour pressure at the mixing head. Air is permitted to escape from the solenoid operated valve 80 as the liquids enter the metering tubes so that there is effectively little or no back pressure on the liquid components A and B as they fill the respective metering tubes 40 and 52. If either component A or B is out of proportion, a proper adjustment is made to the pump 12 or 16. After evacuation of the metering tubes 40 and 54, the calibration is then carried out again to check the accuracy of the adjustments. Valves 27 and 29 are opened and the solenoid valve 80 is switched to connect the cylinder 66 with air pressure to push components A and/or B from metering tubes 40 and/or 54 back into the tanks 10 and 14 through line 26, valve 20, valve 27 and line 28, valve 32 and valve 29 through an inert liquid between the pistons 72 and 59 and 72 and 52.

If it is not desired to use an inert liquid between the air and the liquid to accomplish the evacuation of metering tube 40 and/or 54, air as controlled by solenoid valve 80 can be pressured directly into metering tubes 40 and/or 54 by means of line 84 so as to similarly accomplish the evacuation of the liquid materials contained therein.

Various neutral substances may be used in pneumatic container 66 depending upon the nature of the liquids being calibrated. When calibrating the isocynate component, it is preferable to use dioctylphthalate (DOP) to prevent crystallization in the isocynate due to moisture in the air.

In actual practice, the calibration device is wired to a conventional control panel utilizing a selector switch for "calibration," "dump," and "off" positions. The system has been shown utilizing a "pour timer" normally used with a mixing head. Alternatively, a separate timer can be supplied with the calibration device to control the amount of components being injected into metering tubes 40 and/or 54.

The invention has been described with reference to a system for calibrating resin and isocynate components in a polyurethane system. It is to be understood that the invention can also be used for one or more than two liquid materials which can be any type of liquid. The calibration can take place at room temperature or at elevated temperatures if desired.

It will be understood that various changes in the details, materials, steps and arrangement of parts, which have been herein described and illustrated in order to explain the nature of the invention, may be made by those skilled in the art within the principles and scope of the invention as expressed in the appended claims.

The embodiments of the invention in which an exclusive property or privilege is claimed are defined as follows:

1. A volumetric calibration device for measuring amounts of at least one moisture sensitive liquid material flowing in a liquid circulating system, said device comprising:

volumetric holding means;

measuring means on said holding means for ascertaining the amount of material being contained therein;

valve means in flow communication with said holding means and said liquid circulating system, said valve means being capable of selectively controlling the flow of liquid material to said holding means and from said liquid circulating system;

means for returning the liquid material from said holding means to said liquid circulating system; and drive means in flow communication with said holding means for displacing the liquid material contained in said holding means to return said liquid material through said liquid material returning means to said liquid circulating system, said drive means including a moisture-free fluid material inert with respect to said one liquid material and means for selectively pressurizing said inert fluid material, and further comprising a solid movable separator in said volumetric holding means to separate said one liquid material from said inert fluid material;

whereby said liquid can be supplied and returned to said circulating system without contamination or exposure to the operators.

2. The volumetric calibration device of claim 1, wherein said selective pressurizing means comprises a source of compressed air.

3. The volumetric calibration device of claim 1, wherein said volumetric holding means comprises a plurality of volumetric tubes and said valve means communicates each of said volumetric tubes with a separate liquid circulating system whereby liquid components of a system can be calibrated simultaneously.

4. In a urethane dispensing system wherein liquid resin and isocynate components are pumped to a mixing head for dispensing a mixture of said liquid components, the improvement which comprises:

the device according to claim 3;

whereby said liquid components can be simultaneously calibrated without exposure to the atmosphere or without exposure to workers and thereby saving the material used in calibration.

5. A volumetric calibration device according to claim 1, and further comprising a cylinder in flow communication with said holding means for receiving displaced inert liquid material as said liquid component is introduced into said holding means.

6. A volumetric calibration device according to claim 1, wherein said volumetric holding means comprises a clear cylinder of uniform diameter for observation of the level of liquid material therein.

7. In a liquid circulating system having a reservoir containing a liquid material: a mixing head for dispensing at least the liquid material in controlled amounts during timed intervals; a fluid supply conduit between said reservoir and said mixing head; a pump in said fluid supply conduit to pump said liquid material to said mixing head at a predetermined rate; a fluid return conduit between said mixing head and said reservoir to return said liquid material to said reservoir; a volumetric calibration device for measuring amounts of the liquid material dispensed by the mixing head, the volumetric calibration device comprising volumetric holding means, means for ascertaining the amount of material contained in said holding means, valve means in flow communication with said holding means and said liquid circulating system, said valve means being capable of selectively controlling the flow of liquid material to said holding means from said liquid circulating system, control means for switching said valve means in timed intervals to allow said liquid material to flow into said volumetric holding means during the timed intervals, and drive means in flow communication with said holding means for displacing the liquid material contained in said holding means to return said liquid material to said liquid circulating system; the improvement which comprises:

said valve means being located in said fluid supply conduit between said pump and said mixing head; and means for returning said liquid material directly to said reservoir from said volumetric holding means.

8. A liquid circulating system according to claim 7 and further comprising pressure control means between said valve means and said volumetric holding means to simulate the pressure of said liquid material as it is dispensed from said mixing head.

* * * * *